May 10, 1927.
G. MUFFLY
1,628,265
HYDROPNEUMATIC CONTROLLER FOR WATER SYSTEMS
Original Filed Sept. 25, 1922
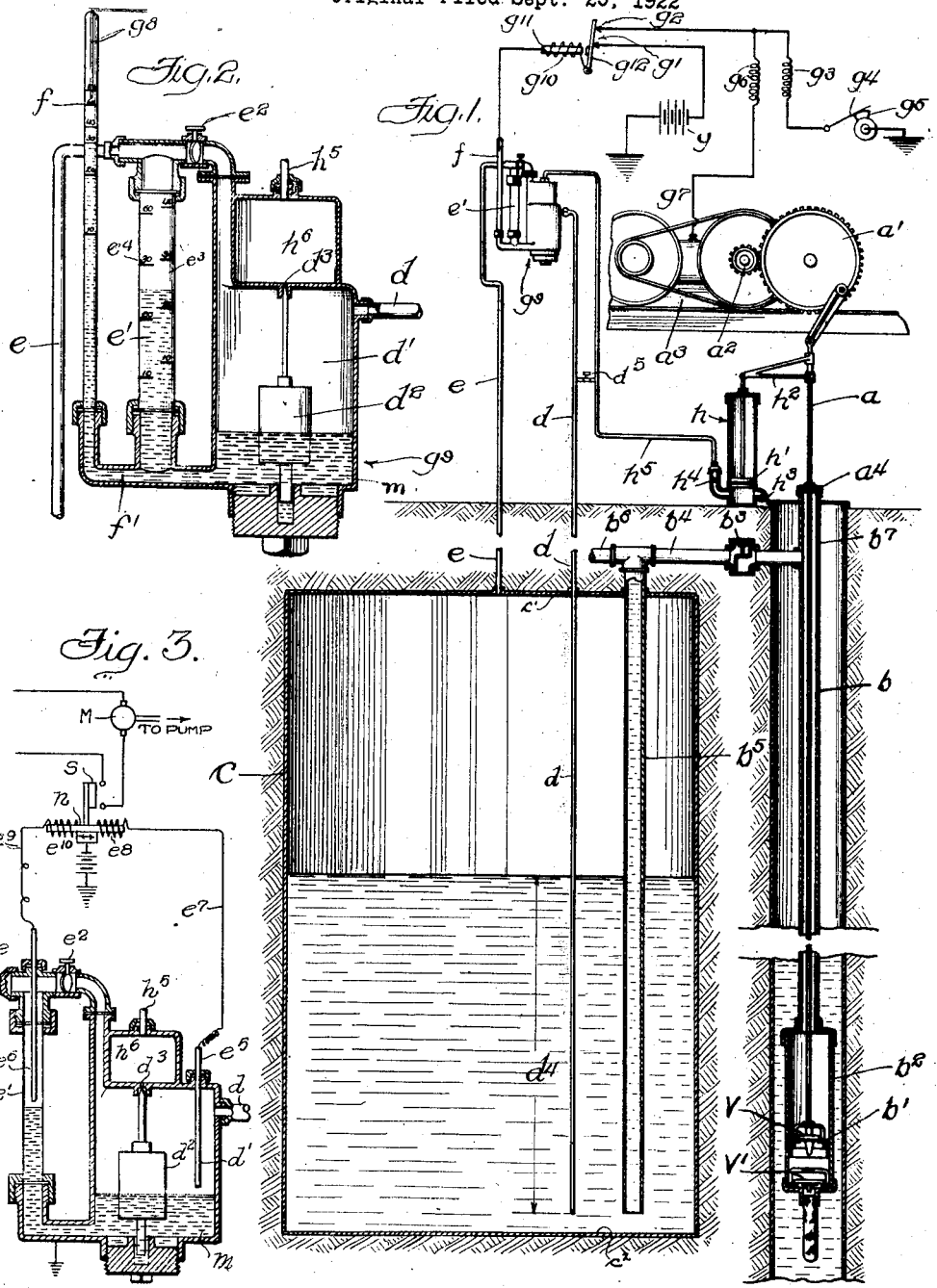
Witnesses:
Wm. Olson
Fred M. Davis
Inventor:
Glenn Muffly
Rummler & Rummler
Att'ys Patented May 10, 1927.

1,628,265

UNITED STATES PATENT OFFICE.

GLENN MUFFLY, OF CLEVELAND HEIGHTS, OHIO.

HYDROPNEUMATIC CONTROLLER FOR WATER SYSTEMS.

Application filed September 25, 1922, Serial No. 590,449. Renewed October 14, 1926.

This invention relates to water supply systems involving pneumatic pressure storage reservoirs, and more especially to automatic controlling and regulating means therefor, in which respects it differs from my copending application, Serial No. 570,069, filed June 22, 1922.

The main objects of the invention are to provide in a pump operated underground storage supply system of the character described, improved means to control the tank pressure and water level; to provide for wholly automatic operation thereof; to provide differential pressure responsive means to control the supply of power to the pump; to provide a pressure responsive unit of compact character to start and stop a power device and to open and close an air supply valve according to needs of the system; and to provide a mercury operated unit of the character stated.

An illustrative embodiment of this invention is shown in the accompanying drawings, in which—

Figure 1 is a diagrammatic view of the system showing the essential relation of the parts.

Figure 2 is a greatly enlarged view of the mercury control unit, showing its essential operating features rather than its specific details of construction.

Figure 3 illustrates diagrammatically how a motor for operating the pump may be started and stopped by automatic switch control.

Referring to Fig. 1, the pump rod $a$ is actuated through the gear $a'$ and pinion $a^2$ by a gasoline engine $a^3$ or other suitable source of power. The rod $a$ extends downward through the stuffing box $a^4$ and drop pipe $b$ and serves to actuate the plunger $b'$ in the cylinder $b^3$, which is of the usual construction for such devices, with a check valve $v$ in the plunger and another check $v'$ in the bottom of said cylinder.

Water raised by plunger $b'$ passes through check valve $b^3$ and pipes $b^4$ and $b^5$ to the storage tank $c$. As the water level rises in the tank $c$ air is compressed in the upper part thereof, and this compressed air serves to force water back up through pipe $b^5$ to the water main $b^6$ and throughout the distribution pipes (not shown) connected therewith.

An air pipe $d$ enters the tank $c$ at the top $c'$ and extends nearly to the bottom $c^2$. Outside of the tank said pipe $d$ connects with the top of the float chamber $d'$, Fig. 2, which is partially filled with mercury $m$. The float $d^2$ is normally lifted by the buoyancy of the mercury to close the needle valve $d^3$. When air is admitted through said needle valve $d^3$ the air passes through the float chamber $d'$ and down through pipe $d$ to bubble up through the water to the top part of tank $c$. This action fills the pipe $d$ with air, which is maintained under compression by the air pressure in the top of tank $c$ and by the head of water represented by the distance $d^4$ from lower end of pipe $d$ to the level of the water in said tank.

The air pipe $e$ connects the top of tank $c$ with the top of gauge glass $e'$, Fig. 2, which glass is connected at its lower end with the float chamber $d'$. The air pressure on the surface of the mercury in the gauge glass $e'$ is the same as the air pressure in tank $c$, while the air pressure acting upon the surface of the mercury in the float chamber $d'$ is equal to the same air pressure plus the head of water represented by the height $d^4$, as shown in Fig. 1. The mercury in gauge glass $e'$ will therefore stand enough higher than the mercury in float chamber $d'$ to balance the height $d^4$ of water above the lower end of pipe $d$. The height of mercury in the gauge glass $e'$ will therefore show on a properly graduated scale $e^3$, as shown on the right hand side, see Fig. 2, the height of water in tank $c$. On another scale of graduations, $e^4$ as shown on the left hand side of glass $e'$, we see what the air pressure should be in tank $c$ for that water level. By making the area of the float chamber $d'$ quite large in proportion to the area of the gauge glass $e'$ the fluctuation of mercury level in the float chamber is reduced to a negligible amount, so far as it affects the accuracy of readings for water level in the gauge glass $e'$, and the graduation intervals may be substantially uniform.

In order to provide means for indicating the air pressure in tank $c$ an additional gauge glass $f$ is provided connecting through passage $f'$ with gauge glass $e'$ and float chamber $d'$. The volume of mercury in this gauge is negligible relative to that in chamber $d'$. Starting with the mercury at a common level in all three columns, any subsequent rise of mercury within gauge glass $f$ will compress the normal atmosphere thus trapped, for the gauge glass $f$ is mounted with an air-tight gasket connection, and is closed at the top. By providing suitable graduations the height of mercury in the gauge glass $f$ is made to indicate the air pressure in tank $c$. The gauge glass $f$ is relatively small compared with gauge glass $e'$, so that fluctuations of mercury level in glass $f$ will not materially affect the level of mercury in glass $e'$. The slight additional pressure created in glass $f$ by a rise of mercury in glass $e'$ may be neglected, as it can only amount to a pound or two per square inch.

Valve $e^2$ is provided for convenience in disassembly and to avoid the spilling of mercury. By opening this valve the pressure will be equalized between the float chamber $d'$ and the gauge glass $e'$. Pipe $e$ is next disconnected, allowing air to exhaust from tank $c$ and then other connections may be broken without danger of blowing mercury out of the case $g^9$ or of forcing water up through pipe $d$.

Battery $g$ furnishes ignition current for the engine $a^2$. The course of the current during the operation of the engine is from one pole of the battery to contact $g'$, thence to contact $g^2$, thence through the primary winding $g^3$ to the spring $g^4$ of the timer, and through cam $g^5$ to ground, thus returning to the opposite pole of said battery. The secondary current induced in the coil $g^6$ by the primary current in coil $g^3$ jumps the gap in the spark plug $g^7$ to ground and returns through the battery and contacts $g'$ and $g^2$ to the opposite end of secondary winding $g^6$.

When sufficient water has been pumped into tank $c$ to raise the level of the water, and so compress the air until the mercury in the gauge glass $f$ contacts with the electrode $g^8$, a connection is thereby made with the grounded metal case $g^9$ through the medium of the mercury, thus closing a circuit as follows:—from battery $g$ through ground to the mercury in case $g^9$, thence to electrode $g^8$, thence to magnet winding $g^{10}$, thence to armature $g^{12}$, thence to contact $g'$ and thence to the opposite pole of said battery, thus completing the circuit which energizes the magnet core $g^{11}$ and pulls the armature $g^{12}$ away from contacts $g'$ and $g^2$. The breaking of these said contacts at $g'$ and $g^2$ opens both battery circuits, stopping the engine and taking all load off of the battery. The armature $g^{12}$ then rests against magnet core $g^{11}$ and said circuits remain open until armature $g^{12}$ is manually moved to re-establish contacts at $g'$ and $g^2$ preparatory to starting the engine.

Various devices and circuits may be arranged to accomplish the desired result of stopping the pump when the water reaches the desired level in the tank. It might for instance be desired to actuate an electrical switch for stopping and starting an electric motor, or to actuate a regulating device to stop and start a windmill, though as such devices are not specifically claimed herein they are not shown in the drawings. Any such result may be accomplished by means of suitable relays and electrodes located within one or more of the gauge glasses of the float chamber. For instance, an insulated electrode introduced through the top of the float chamber $d'$ might make contact with the rising mercury when water level in tank $c$ falls, and a similar electrode introduced through the top of gauge glass $e'$ might make contact with the rising mercury when the water level rises. This is shown by Fig. 3 wherein the chamber $d'$ is provided with an electrode $e^5$ and the gage glass $e'$ is provided with an electrode $e^6$. These electrodes may be adjustable to close contact with the mercury at predetermined heights respectively. One of these electrodes $e^5$ is connected by lead $e^7$ to solenoid $e^8$ and the other $e^6$ by lead $e^9$ to solenoid $e^{10}$. These solenoids $e^5$ and $e^6$ act on the plunger magnet $n$ to close and open the switch $s$ which in turn controls the pump motor M. It would also be possible by means of two or more electrodes properly located to form ungrounded circuits assuming that case $g^9$ is not grounded on the engine or other electrical ground. Should magneto ignition be used on engine $a^2$ the ground wire from the magneto might be connected directly to electrode $g^8$, thus grounding the magneto and stopping the engine at the desired point without the use of the relay circuit shown in the drawing. The armature $g^{12}$ as shown diagrammatically will be of suitable type with well known mechanical details for accomplishing the desired results; for instance armature $g^{12}$ may be equipped with a spring action to snap it over the dead center position of a toggle movement and the points $g'$ and $g^2$ may be arranged on springs to follow the armature as far as the dead center position, thus maintaining the electrical contacts and hence the magnetic pull upon the armature until the spring action breaks the contacts.

The air pump $h$ is here shown with the piston $h'$ driven by means of rod $a$ and bracket $h^2$. Air is taken in through check valve $h^3$ on the up stroke of piston $h'$ and forced out through check valve $h^4$ and $h^5$ on the down stroke. This air is compressed in pipe $h^5$ and chamber $h^6$ to a maximum pressure not exceeding the theoretical compression of pump $h$ as established by the ratio of piston displacement to clearance space. When this point of compression is reached in pipe $h^5$ and chamber $h^6$ the piston $h'$ will compress and expand the same charge of air without pumping more air through check valve $h^4$. It is thus arranged that a pressure in excess of tank pressure is maintained in pipe $h^5$ and chamber $h^6$ so long as needle valve $d^3$ remains closed.

In the event that the water level in tank $c$ rises above the normal high level point, while air pressure remains below the shut-off point where mercury contacts with the electrode $g^8$ the mercury level in float chamber $d'$ will fall due to the rise of mercury in gauge glass $e'$ This causes float $d^2$ to fall, thereby opening the needle valve $d^3$ and admitting air from chamber $h^6$, pipe $h^5$ and pump $h^4$ to the float member $d'$, from whence it is conducted through pipe $d$ to tank $c$, where it bubbles up through the water to the top of the tank, restoring the desired air pressure in the tank. Normally the air in the tank is not drawn off, in the sense that applies to the water, but is gradually lost by absorption in the water and possibly by leakage. From this tendency the result would be a "water-logged" condition of the tank, with the water level too high in relation to the air pressure. By the means above described I have provided for supplying additional air to the tank whenever the water level rises above some predetermined point, so long as the air pressure remains below the shut-off point. When the air pressure has been restored to normal in tank $c$ the column of mercury in gauge glass $f$ will rise to contact with the electrode $g^8$ and stop the pump. No harm is done if the needle valve $d^3$ remains open after the pump is stopped, for check valve $h^4$ will retain the air pressure in the tank.

A by-pass valve $d^5$ is provided to connect the pipes $d$ and $h^5$ whenever it is desired to charge the tank $c$ with air directly, as when it is installed or after it has been emptied for cleaning or for repairs. The valve $d^5$ is then closed and thus remains normally so as to render the float $d^2$ effective.

The needle valve $d^3$ is arranged to open shortly before the desired water level is reached and will thereafter automatically regulate the maximum height of water in tank $c$ to a point slightly above the level at which the needle valve $d^3$ opens.

Although but one specific embodiment of this invention is herein shown and described it will be understood that numerous details of the construction shown may be altered or omitted without departing from the spirit of this invention as defined by the following claims.

I claim:

1. In a water supply system of the character described a fluid pressure gauge having a column of liquid arranged to rise and fall within a closed chamber under the action of pneumatic pressure, and means controlled by the rise and fall of said liquid for operating an electrical switch.

2. In a water system, a hydro-pneumatic storage tank, a pipe connecting with said tank adjacent to its top, a pipe connecting with said tank adjacent to its bottom, means for supplying air under pressure to the second of said pipes and pressure responsive means controlled by the difference in pressure between said pipes for regulating the supply of air for said tank.

3. A hydro-pneumatic storage tank, a pipe connecting with the air space which is provided for in the top of said tank, a pipe connecting with said tank adjacent to its bottom, means to supply compressed air to said tank through the latter pipe and means actuated by the difference in pressure between the two said pipes for controlling the supply of air to said tank through the said pipe to the bottom of the tank.

4. In combination a hydro-pneumatic storage tank, a gauge located outside of said tank and connected thereto pneumatically for the purpose of indicating the pneumatic pressure within said tank, a chamber within said gauge closed gas-tight at its top, a column of liquid forced upward within said chamber under the influence of pneumatic pressure within said tank, a quantity of gas trapped within said chamber by the rising column of liquid, and an electric switch actuated by the movement of said column of liquid for the purpose of controlling the supply of liquid to said tank.

5. In a water supply system, in combination, a hydro-pneumatic storage tank, and a controlling instrument in which are combined means for indicating the level of water within said tank, means for indicating the pneumatic pressure within said tank, means for controlling the supply of air to said tank, and means for controlling the supply of water to said tank.

6. In a water supply system, a hydro-pneumatic storage tank, an instrument pneumatically connected with said tank, in which instrument are combined means for indicating the level of water in said tank, means for indicating the fluid pressure within said tank, and means for controlling the operation of said system.

7. In a water supply system, a pump, a hydro-pneumatic storage tank, and a controller comprising a gas-tight chamber, a column of liquid forced upward within said chamber by fluid pressure, a quantity of gas trapped within said chamber by said column of liquid, and means actuated by the movement of said column of liquid for controlling the source of power for said pump.

8. In a water supply system, a hydro-pneumatic storage tank, a pneumatically connected instrument actuated by the changing of water level in said tank, and means actuated by said instrument for the regulation of air supply to said tank.

Signed at Chicago this 19 day of Sept., 1922.

GLENN MUFFLY.